United States Patent [19]

Hartl

[11] Patent Number: 4,537,526

[45] Date of Patent: Aug. 27, 1985

[54] HUB MOUNTING DEVICE

[75] Inventor: Werner Hartl, Plainsboro, N.J.

[73] Assignee: Roller Bearing Company of America, West Trenton, N.J.

[21] Appl. No.: 672,236

[22] Filed: Nov. 16, 1984

[51] Int. Cl.³ .............................................. F16B 2/14
[52] U.S. Cl. ..................................... 403/370; 403/371
[58] Field of Search ................. 403/371, 370, 368, 16, 403/369

[56] References Cited

U.S. PATENT DOCUMENTS

| | | | |
|---|---|---|---|
| 2,691,541 | 10/1954 | Benedek | 403/370 |
| 3,849,014 | 11/1974 | Maxey | 403/370 |
| 4,367,053 | 1/1983 | Stratienko | 403/371 |

Primary Examiner—Andrew V. Kundrat
Attorney, Agent, or Firm—Sperry, Zoda & Kane

[57] ABSTRACT

A device for coupling a shaft and the hub of a machine element such as a pulley or gear for joint rotation, includes annular outer and inner wedges each of which has angularly spaced longitudinal slots, and ribs aligned with the slots. The wedges telescope so that the ribs of one wedge extend into the slots of the other, aligning longitudinal bores of the ribs to receive fastening elements such as screws. The fastening elements thus impart relative axial movement to the wedges to expand the same radially into gripping engagement with the shaft and hub.

11 Claims, 11 Drawing Figures

HUB MOUNTING DEVICE

BACKGROUND OF THE INVENTION

1. Field of the Invention

The present invention relates generally to annular wedging or clamping rings of the type that are extendable about a shaft received within the bearing opening of the hub of a pulley, gear, or the like. The device is intended to engage the hub on the shaft for joint rotation and has complementary wedging surfaces in relative slidable contact with each other, whereby relative axial movement of the wedging or clamping rings causes the inner diameter of the device to be reduced to the shaft diameter, while the outer diameter of the device is increased to the diameter of the bearing opening of the hub.

2. Description of the Prior Art

It is very common to provide devices for locking a hub and a shaft together for joint rotation, with the devices being in the form of cooperating, annular wedges that expand regularly through the application of force tending to increase the outer diameter of the locking device and/or reduce the inner diameter thereof.

Typically, devices of this type include an outer wedging ring, having a constant diameter outside surface adapted to bear against the surface of the bearing opening of a hub, and having a tapered inside surface slidably contacting the complementarily tapered outer surface of an inner wedging ring. The inner wedging ring typically has a constant diameter, cylindrical inner surface adapted to engage the shaft to which the hub is to be coupled so that they may rotate together.

The force for relatively axially shifting the outer and inner wedging rings is often in the form of a circumferential series of screws engageable in threaded openings of one of the wedging rings, although in some cases, they are engageable in threaded openings formed in a third, annular, force-supplying element.

Devices of this type have had the disadvantage that in many instances, the overall length of the device is determined by the length of the force-applying screws or bolts. And, it has been noted that in the prior art devices, the bolts may become "pinched", thus complicating their removal whenever the device is to be disengaged from the hub and shaft.

Still further, in the manufacture of devices of this type it has been difficult, very often, to achieve true concentricity, due to the manner in which they are designed.

Still further, it has also been true that devices of this type have been, in some instances, excessively complicated, require excessive attention to dimensions with precision fits and low tolerancing being required, and with other characteristics that make manufacturing relatively expensive and difficult.

SUMMARY OF THE INVENTION

Summarized briefly, the present invention comprises three main components: an outer wedge, an inner wedge, and a series of screws. The outer wedge is a one-piece sleeve, having a constant diameter outer surface and a tapered inner surface. The inner wedge is a mating sleeve, having a tapered outer surface and a constant diameter inner surface. Each wedge is formed with a series of angularly spaced, longitudinal slots. Each wedge is also formed with a series of longitudinal ribs angularly spaced thereabout, each rib of a wedge being aligned with a slot of the wedge. As a result, when the wedges are interfitted, the ribs of one wedge are received in the slots of the other. In these circumstances, corresponding ribs of the respective wedges move into alignment in the axial sense.

The ribs of one wedge have bores that are smooth surfaced. Those of the other wedge have threaded bores. As a result, screws extending through the axially aligned bores of corresponding ribs, engage in the threaded bores of the one wedge, with the heads of the screws bearing against an adjacent edge of the other wedge. Tightening of the screws will relatively axially shift the wedges in a direction to radially expand the device into gripping engagement with the shaft and hub respectively.

During manufacture, after initial assembly of the parts, end-to-end slits are formed in the respective wedges. These "match-mark" the wedges, so that they can be thereafter disassembled and shipped, and reassembled in the exact same relationship that they had during manufacture. This assures maximum adherence to concentricity, so that in use, the efficiency of the gripping action of the wedges upon the hub and shaft respectively, is distinctly increased.

BRIEF DESCRIPTION OF THE DRAWING

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
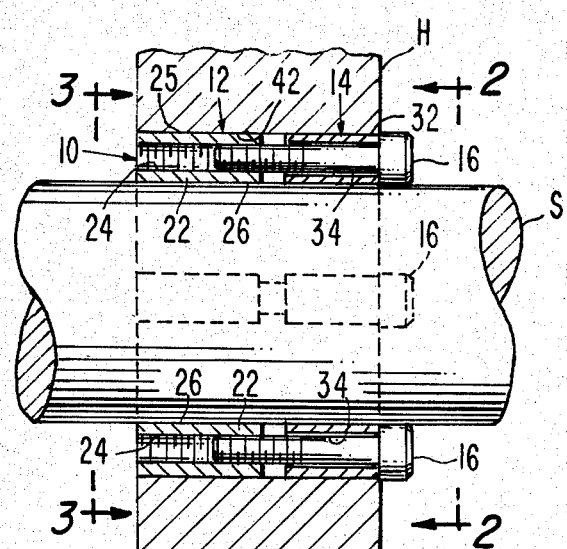
FIG. 1 is a longitudinal sectional view through a hub mounting device according to the present invention as it appears when in use, in which the hub is illustrated fragmentarily and in section, and the shaft is illustrated fragmentarily.

The hub mounting device comprised in the present invention has been generally designated 10, and in FIGS. 1–4 has been illustrated in assembled condition, as it appears when in use. In these Figures of the drawing, the device 10 is illustrated as a means coupling a hub H of a gear, pulley, drive wheel, or any other rotary machine element, to a shaft S for rotation therewith.

The hub mounting device 10 comprises three main components: an outer wedge generally designated 12, an inner wedge 14, and a series of screws 16.

Outer wedge 12 is an annular member in the form of a sleeve or ring, formed at uniformly, angularly spaced intervals with wide longitudinal slots 18 extending inwardly from one end thereof and terminating intermediate the ends of the sleeve. A minimum of four slots is preferred, but the number could be increased.

The inner surface 20 of outer wedge 12 is tapered from end-to-end of the wedge over the full inner circumference thereof, interrupted only by the slots 18 and a series of longitudinal internal ribs 22 aligned longitudinally with the respective slots and extending from the closed inner ends of the slots to the thicker, unslotted other ends of the wedge. Ribs 22 have end-to-end, threaded bores 24.

The outer surface 25 of the outer wedge 12 is cylindrical and of constant diameter from end-to-end of the wedge.

Figure 3:
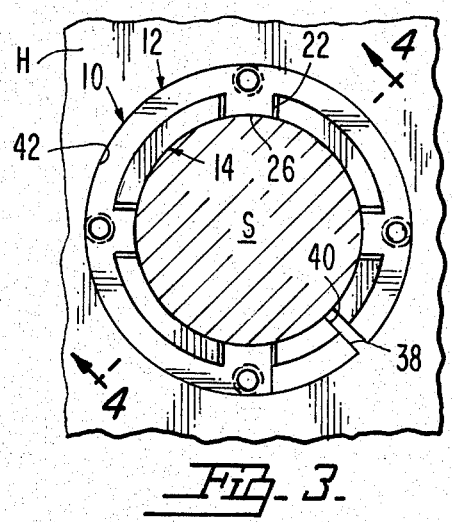
FIG. 3 is a cross-sectional view on line 3—3 of FIG. 1, illustrating the device as it appears when viewed from the other end.

Referring to FIGS. 1 and 3, the several ribs 22 have inner surfaces 26 which are transversely curved in concentricity with the cylindrical outer surface 25 of the outer wedge. The outer surfaces of the ribs 22 lie flush with and are curved about the same radius as the cylindrical outer surface 25.

The inner wedge 14 is formed as an annular element or sleeve having the same length as the outer wedge. It has a tapered outer surface 28, tapered continuously from end-to-end of the inner wedge and matching the taper of the inner surface 20 of the outer wedge (see FIG. 4).

Figure 4:
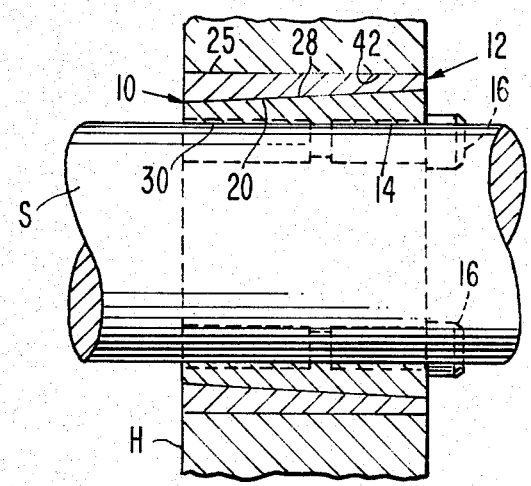
FIG. 4 is a view similar to FIG. 1, taken on line 4—4 of FIG. 3.
Figure 5:
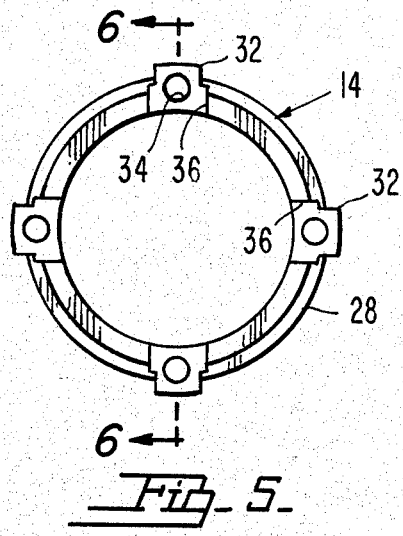
FIG. 5 is an end elevational view of the inner wedge, per se, as seen from line 5—5 of FIG. 6.

The inner wedge has a cylindrical inner surface 30 constant in diameter from end-to-end of the inner wedge (FIG. 6), and this bears against the surface of the shaft S when the device is in use (FIG. 4).

External ribs 32 having end-to-end, smooth walled bores 34, are integrally formed upon the inner wedge, extending longitudinally thereof from the thicker end of the inner wedge to a location short of the mid-length point thereof, from which location wide longitudinal slots 36 extend the remainder of the length of the inner wedge, opening upon the thinner end thereof.

Figure 7:
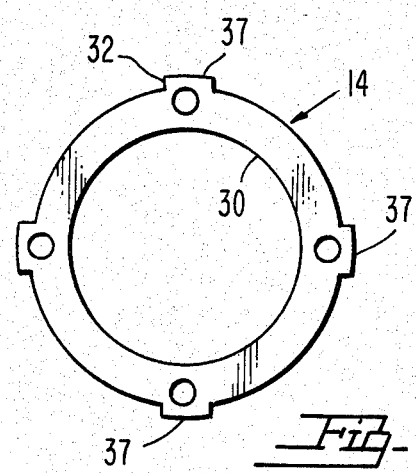
FIG. 7 is an end elevational view of the inner wedge as seen from line 7—7 of FIG. 6.
Figure 8:
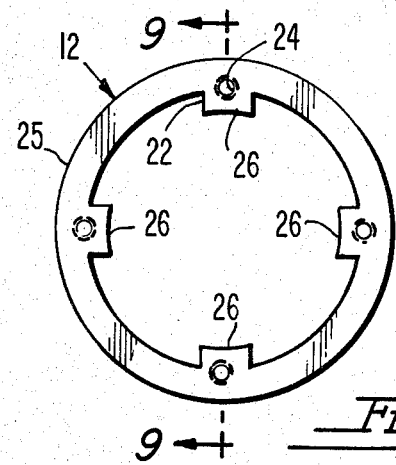
FIG. 8 is an end elevational view of the outer wedge, per se.

The external ribs 32 have outer surfaces 37 (see FIG. 7) that are curved about the same radius as the cylindrical outer surface 25 of the outer wedge 12. Meanwhile, the inner surfaces 26 of the internal ribs 22 are curved about the same radius as the cylindrical, constant diameter inner surface 30 of the inner wedge.

Figure 6:
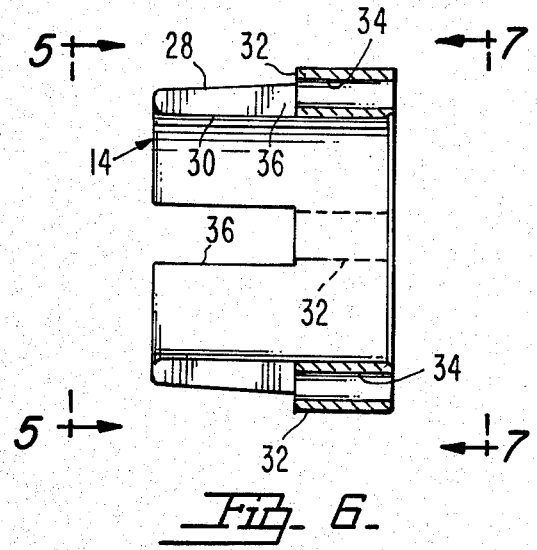
FIG. 6 is a longitudinal sectional view through the inner wedge, per se, taken substantially on line 6—6 of FIG. 5.
Figure 9:
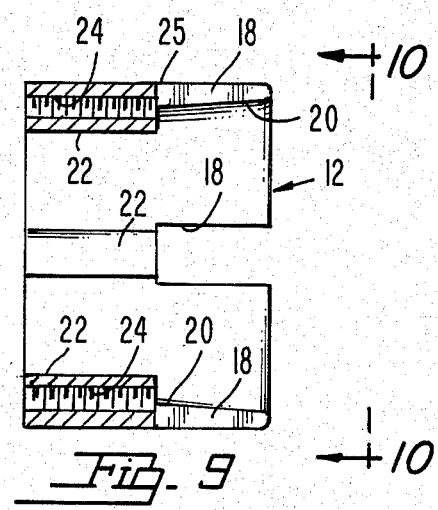
FIG. 9 is a longitudinal sectional view of the outer wedge, taken substantially on line 9—9 of FIG. 8.
Figure 10:
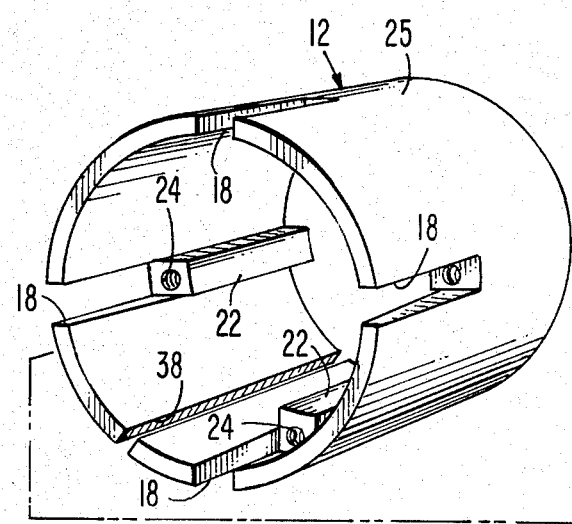
FIG. 10 is an end elevational view of the outer wedge, showing the end opposite that seen in FIG. 8, as viewed from line 10—10 of FIG. 9.
Figure 10:
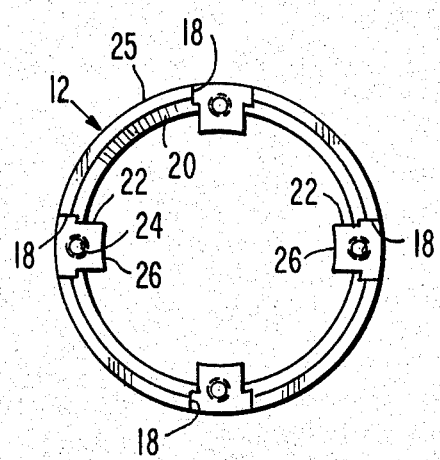

In the manufacture of the device, the inner and outer wedges are interfitted by inserting the tapered, thinner end of the inner wedge, shown as the left-hand end in FIG. 6, into the thinner, tapered end of the outer wedge, shown as the right-hand end thereof in FIG. 9. In so assembling the wedges, each slot 36 of the inner wedge is aligned with and receives a rib 22 of the outer wedge, while each slot 18 of the outer wedge aligns with and receives an external rib 32 of the inner wedge.

In these circumstances, the tapered inner and outer surfaces of the wedges 12, 14 respectively are in slidable, mating relation (see FIG. 4), and the several ribs 22 of the outer wedge align with the several ribs 32 of the inner wedge (FIG. 1).

Figure 11:
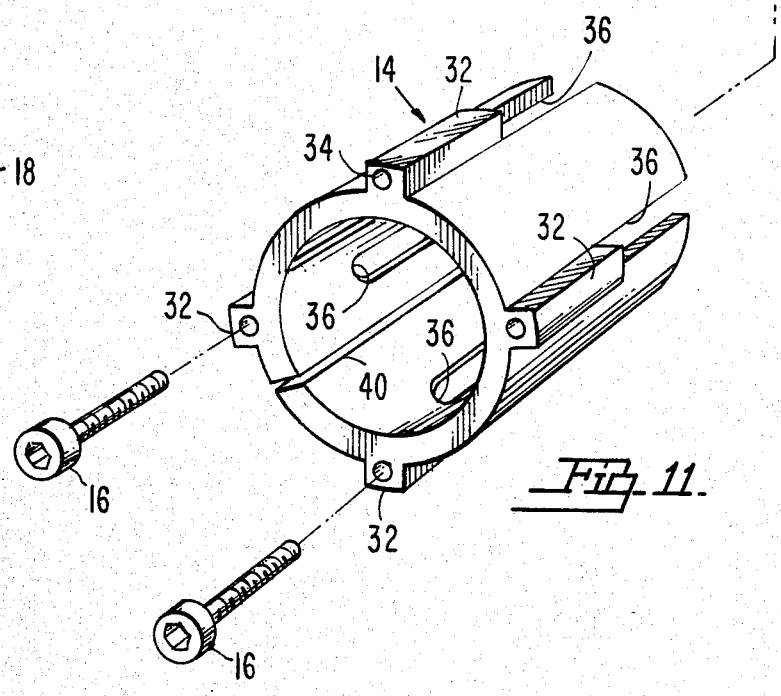
FIG. 11 is an exploded perspective view of the wedge assembly comprised in the present invention.

Screws 16, only two of which are shown in FIG. 11 though four would be used, are now extended through the smooth wall bores 34, with their heads bearing against the thicker end of the inner wedge, shown as the right-hand end in FIG. 6. The screws threadedly engage in the bores 24 of the ribs 22.

At this time, during the manufacture of the device, both wedges are slit from end-to-end thereof as shown at 38, 40 in FIGS. 1, 3, and 11. This will facilitate the tightening of the inner wedge about the shaft. Also, the formation of slit 40 in the outer wedge facilitates the tight, gripping engagement of its cylindrical outer surface 25 against the surface of the bearing opening 42 of the hub.

Figure 2:
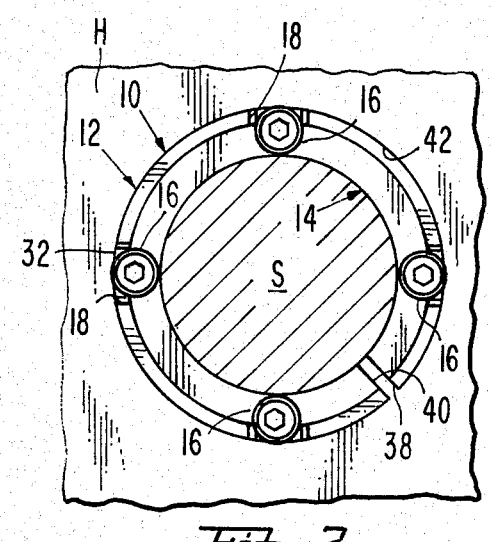
FIG. 2 is a cross-sectional view taken substantially on line 2—2, of FIG. 1 illustrating the device as it appears in its assembled, use condition when viewed from one end thereof.

Of importance, in this connection, is the fact that the slits 38, 40 are formed at the same location during the manufacture of the device, to "match-mark" the assembled sleeves. Thereafter, they may be immediately disassembled for shipment. When reassembled for use in mounting a hub upon a shaft, the slots 38, 40 would again be aligned as shown in FIGS. 2 and 3. This is of particular importance, in that the wedging sleeves are always returned to the interfitted relationship predetermined thereby at the time of manufacture, and are never relatively rotated in a manner that would change the interfaced areas of the mating tapered surfaces thereof.

It should further be noted that in the manufacture of the device, it is preferred to coat the tapered surfaces 20, 28 with a stable dry anti-friction material, such as Teflon ®, to facilitate the radial expansion of the device radially inwardly into engagement with the shaft, and radially outwardly into engagement with the surface of the bearing opening 42 of the hub H.

In use of the device, the screws are backed out sufficiently to permit the wedge assembly to be inserted into the space between the shaft and the surface of the bearing opening 42. Then, the screws are threaded inwardly, and with their heads bearing against the adjacent end of the inner wedge, they are rotated in a direction to further telescope the wedges. This produces the radial expansion of the wedges into tight gripping engagement with the shaft and the bearing opening surface 45.

The construction is one that permits manufacture at relatively low expense, from a minimum member of simply designed parts. Of importance is the fact that the construction permits use of screws of relatively short length, without regard to the overall length of the wedging sleeve assembly. This is of importance, in that heretofore, the design of devices of this type has in general required the use of extremely long, thin bolts, used in a design that required an increase in the total number of components, as well as requiring a limitation on the length in which the device can be made. Further, the bolts tended to become "pinched", making removal thereof difficult.

It may also be noted that the design is one that permits the device to be shipped either in a disassembled state or alternatively in an assembled condition. If the latter mode of shipment is chosen, the components are already match-marked by the slits, and therefore no difficulty will be experienced by the ultimate user, in correctly relating the wedging components in the event of further disassembly and assembly at the point of use. In every instance, true concentricity is achieved, in an exceedingly simple, trouble-free design.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A radially expandable device for mounting a hub of a machine element having a mounting opening, upon a shaft extending through said opening, said device being interposed between the shaft and said element within the opening and comprising:
   (a) an annular outer wedge having a circumferential series of first slots and including a series of internal ribs aligned with the respective slots, said wedge having an outer surface bearing against the surface of said opening;
   (b) an annular inner wedge having a circumferential series of second slots receiving the internal ribs and including a series of external ribs aligned with the second slots and receivable by the first slots, the internal and external ribs having bores aligning with each other when the several ribs are received within their associated slots, the inner wedge having an inner surface bearing against the shaft and a tapered outer surface in slidable engagement with the tapered inner surface of the outer wedge; and
   (c) fastener means extending through the aligned bores of the ribs and adapted to move the wedges relative to each other in an axial direction and thereby expand the same radially into gripping engagement with the shaft and said element.

2. A hub mounting device as in claim 1 wherein the several internal and external ribs have inner surfaces all of which have a common radius and are curved about a common center.

3. A hub mounting device as in claim 2 wherein the several ribs have outer surfaces all of which have a common radius and are concentric with said inner surfaces of the ribs.

4. A hub mounting device as in claim 1 wherein the several ribs of the outer wedge are in end-to-end relationship with the corresponding ribs of the inner wedge.

5. A hub mounting device as in claim 4 wherein adjacent ends of corresponding ribs of the respective wedges are spaced apart a distance selected to permit limited radial expansion of the wedges.

6. A hub mounting device as in claim 1 wherein the outer and inner wedges have cylindrical, constant-diameter outer and inner surfaces respectively frictionally engageable with the surfaces of the hub opening and shaft respectively in response to said relative axial movement of the wedges.

7. A device as in claim 6 wherein the several ribs of the respective wedges have outer and inner surfaces curved concentrically with the outer surface of the outer wedge and the inner surface of the inner wedge, respectively.

8. A device as in claim 1 wherein the bores of the ribs of one of the wedges are threaded, said fastener means comprising screws engaged in the threaded bores and formed with heads bearing against the other wedge.

9. A radially expandable device for mounting a hub upon a shaft, comprising:
   (a) outer and inner wedges bearing against the hub and shaft respectively and having slidably contacting, tapered surfaces, each wedge having circumferentially spaced slots and having ribs aligned with the slots, the ribs of one wedge extending within the slots of the other wedge in alignment with the ribs of said other wedge; and
   (b) fastening elements extending through the aligned ribs for relatively axially shifting the wedges in a direction to radially expand the same into gripping engagement with the hub and shaft.

10. A hub mounting device as in claim 9 wherein the outer and inner wedges have constant diameter outer and inner surfaces respectively for engaging the hub and shaft, and the ribs of both wedges have curved outer and inner surfaces concentric with said outer and inner surfaces of the wedges.

11. A hub mounting device as in claim 1, wherein said wedges have registering slits extending from end-to-end thereof.

* * * * *